(12) United States Patent
Lee et al.

(10) Patent No.: US 6,493,155 B1
(45) Date of Patent: Dec. 10, 2002

(54) THIN INFRARED LENS

(75) Inventors: Tzong-Sheng Lee, Hsinchu (TW); Tsung-Ter Kuo, Hsinchu (TW); Chin-Ming Yu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 60 days.

(21) Appl. No.: 09/697,287

(22) Filed: Oct. 27, 2000

(51) Int. Cl.$^7$ .............................. G02B 3/08; G02B 9/00; G02B 13/14

(52) U.S. Cl. ..................... 359/742; 359/743; 359/738; 359/355

(58) Field of Search .................................. 359/742, 743, 359/741, 738, 355, 356, 566, 753, 565

(56) References Cited

U.S. PATENT DOCUMENTS 5,337,179 A * 8/1994 Hodges ...................... 359/443
5,867,307 A * 2/1999 Myers et al. ............... 359/350

FOREIGN PATENT DOCUMENTS

JP  61122602 A  * 11/1984
JP  4062230477 A  * 12/1992

* cited by examiner

Primary Examiner—Georgia Epps
Assistant Examiner—Timothy Thompson
(74) Attorney, Agent, or Firm—Bacon & Thomas

(57) ABSTRACT

A novel thin infrared lens comprising an infrared lens and a hard and thin substrate that allows infrared lights to penetrate, is disclosed. The infrared lens may be a Fresnel refraction lens, prepared as a thin film by injection or casting. The infrared lens is attached to the thin substrate to form a lens assembly. The infrared lens may be pressed or adhered to the thin substrate or enveloped by the thin substrate to form the assembly.

11 Claims, 2 Drawing Sheets

THIN INFRARED LENS

FIELD OF INVENTION

The present invention relates to a thin infrared lens, especially to an assembled infrared optical lens.

BACKGROUND OF INVENTION

In the field of the infrared sensing system, especially in a thermal imager, the sensor and the infrared optical system are two most important elements. Thanks to the development of the two-dimensional matrix sensing element, the cost of the infrared sensing system has been greatly decreased. However, in order to make it possible for the infrared sensing system become popular, it is necessary to reduce the manufacture costs for the optical system of the infrared sensing system.

The infrared optical system may be divided into three groups. They are the refraction type, the reflection type and the diffraction type.

In a reflection type infrared system, when a wider viewing angle is desirable, it is necessary to provide a larger space for the optical system, if the non-coaxial light system is employed; if the coaxial light system is used, a portion of the incident light would be blocked, such that the sensitivity of the optical system will be damaged.

In contrast, the refraction type infrared optical system uses a coaxial light system and is easy to manufacture and use. The structure of a refraction type infrared system may be very compact. In such a system, the aberration of the system may be calibrated by using a spherical lens or by adding number of lens thereto. As a result, the refraction type infrared system is advantageous over the reflection type infrared system.

The refraction type infrared optical system, however, is greatly limited by the materials of the optical elements.

It is known that materials that allows mid to far infrared band to penetrate are limited. Materials that may be used in a refraction type infrared optical system include Ge, Si, ZnSe and poly ethylene (PE) plastics. Among these materials, Ge is most commonly used. It is also known that, if preparation costs of the infrared optical system shall be saved, a thin Fresnel fraction lens will be first choice.

As known to the public, when a convex lens is thinned by dividing its curvature with concentric circles, the lens may provide the same focusing effects. Although the notches in the lens may cause scattering and damage the quality of the image, such thinned lens is suited in an infrared optical system, since the spatial resolution of the sensor matrix of the infrared sensing system is always low. As to the design of the concentric circles, they may be concentric circles with diameters at a constant difference or a diminished difference. In a Fresnel lens of the constant difference type, the outer circles have greater height and deeper grooves, relatively to the inner circles. In a Fresnel lens of the diminished difference type, all grooves may have the same depth and number of concentric circles in the central area is less than that in the outer area.

In the preparation of a lens, the more circles it has, the less its thickness can be but the greater the scattering of light beams may be. In a diminished difference type Fresnel lens, number of circles in the central area is less than that in a constant difference type lens in the same area. The imaging quality of a diminished difference type lens is better than that of a constant difference type lens. However, due to the limitations of preciseness in preparing the outer circles, it is still difficult to make the central area as thin as desired.

The thickness of a Fresnel lens is always far less than that of a traditional refraction type lens. As a result, it is not necessary to prepare a Fresnel lens with high-transmission rate but expensive materials. It is possible to produce in quantity Fresnel lenses with PE plastics by injecting or casting the plastic materials to molds of the lens. In order to improve the hardness, thermal resistance and transmission rate of PE materials, suited additives may be added and the hydrogen atoms contained in the plastic materials may be removed. Such lenses are commonly used in the human body temperature sensing lamp switch and security systems. A tens array may be used in combination with pilot sensors, such that moving objects may be sensed.

Another approach to prepare a thin lens is the diffraction infrared lens. A silicon or germanium lens with binary steps may be prepared by etching a wafer or forming a thin film on a wafer. Such a binary optical lens is called a fresnel phase plate. In order to improve its diffraction efficiency and its focusing effects, adding the number of steps is required. In order to improve its chromatic aberration in the infrared band, it is possible to use a hybrid lens comprising a diffraction lens and a refraction lens.

Although the above-said approaches are able to prepare a thin infrared lens, they inherit different problems. The PE plastic lens is low in cost but is soft, tends to deformation and is less resistant to high temperature. A PE plastic lens may not be used as a preposition optical element. On the other hand, the diffraction lens is hard in material but is difficult to prepare, because the optical preciseness in the outer area of the lens is highly required. In addition, because of the relatively great number of circles, the optical scattering of the lens may go beyond applicable requirements.

It is thus a need in the industry to provide a novel thin infrared lens that can provide improved transmission rate for infrared lights and improved focusing effects and that can satisfy the requirements in thickness and hardness.

OBJECTIVES OF THE INVENTION

The objective of this invention is to provide a novel thin infrared lens.

Another objective of this invention is to provide a thin infrared lens that can satisfy the requirements in thickness and in hardness at the same time.

Another objective of this invention is to provide a thin infrared lens that is easy to produce under a relatively low cost.

Another objective of this invention is to provide a thin infrared lens comprising an infrared lens and a hard thin substrate.

SUMMARY OF INVENTION

According to this invention, a novel thin infrared lens is disclosed. The thin infrared lens of this invention comprises an infrared lens and a hard and thin substrate that allows infrared lights to penetrate. The infrared lens may be a Fresnel refraction lens, prepared as a thin film by injection or casting. The infrared lens is attached to the thin substrate to form a lens assembly. The infrared lens may be pressed or adhered to the thin substrate or enveloped by the thin substrate to form the assembly.

The above and other objectives and advantages of this invention may be clearly understood from the detailed description by referring to the following drawings.

DETAILED DESCRIPTION OF THE INVENTION

This invention discloses a novel thin infrared lens comprising a hard thin substrate and an infrared lens attached thereto. The infrared lens may be a Fresnel refraction lens. The hard thin substrate may be prepared with an infrared optical material, such as Ge or Si. In order to reduce the preparation costs, the thin substrate may be a double-faced polishing wafer. Thickness of the thin substrate may be decided according to requirements of the optical system. If necessary, a reflection resistant film for different bands of infrared may be applied to the thin substrate at desired areas. If the lens is a Fresnel lens and the material is polyethylene (PE), no reflection resistant film is necessary, since the reflectivity of PE material is about ~1.5.

In the preparation of the infrared lens, a pattern may be prepared by an NC mill. The pattern is designed according to the specification and requirements in the optical system to decide the cross sectional design of the lens. In general case, the width of the grooves may be as small as 0.003". By using a mill equipped with a diamond knife having a nose of, e.g., 0.0001", it is possible to prepare a pattern with a aspheric curved surface.

Lens membranes are prepared by injecting or casting plastic materials, employing the pattern so prepared. Material of the lens may be PE or other materials with good penetrability. The lens so prepared is adhered to the hard thin substrate to form an assembly. The thin infrared lens of this invention is thus prepared.

In the present invention, thickness of the infrared lens may be decided according to the requirements in transmission rate and in the quality of imaging. When a medium level of image quality is required, number of concentric circles may be increased, such that thickness of the lens may be further reduced and transmission rate of the lens may be enhanced. The cross sectional design of the lens may be that of a constant difference type lens or that of a diminished difference type lens. Detailed specification of the lens may be decided according to the requirements in focus, refractivity and other factors.

Material of the thin substrate may be Si or Ge wafer. On the edge of the wafer, a reflection resistant film may be applied to enhance the transmission rate of the lens.

The purpose of the hard thin substrate is to maintain the shape of the plastic lens, such that the lens may be prepared as thin as practicable, while requirements in transmission rate and refractivity may be satisfied.

Figure 1:
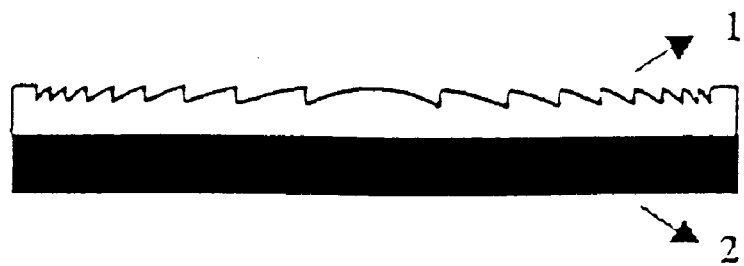
FIG. 1 illustrates the cross sectional view of a thin infrared lens of this invention, as prepared by pressing an infrared lens to a hard thin substrate.
Figure 2:
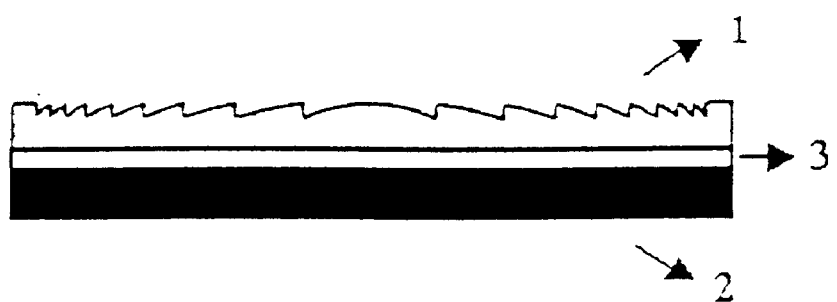
FIG. 2 illustrates the cross sectional view of a thin infrared lens of this invention, as prepared by adhering an infrared lens to a hard thin substrate.
Figure 3:
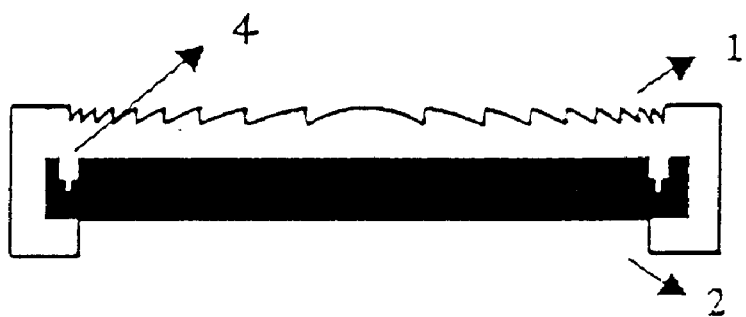
FIG. 3 illustrates the cross sectional view of a thin infrared lens of this invention, as prepared by enveloping an infrared lens with a hard thin substrate.

The assembly of the lens and the substrate may be pressed, adhesion or enveloping. FIGS. 1–3 show cross sectional views of the thin infrared lens of this invention, as the lenses and the substrates being assembled by pressing, adhesion or enveloping, respectively. In FIG. 1, 1 is an infrared lens and 2 is a hard thin substrate. The infrared lens 1 is injected or cast to the substrate 2 directly. In FIG. 2, 1 is an infrared lens and 2 is a hard thin substrate. The lens 1 is adhered to the substrate 2 with an adhesive 3. In this embodiment, the adhesive 3 may be an adhesive for optical elements that can solidify when an ultraviolet light is applied thereto. The commonly available UV adhesive is one of the applicable adhesives. Such a UV adhesive provides a refractivity of about 1.5 and is durable under higher temperature. It is thus taken for reference in this invention.

FIG. 3 shows the cross sectional view of another embodiment of the thin infrared lens of this invention. In this figure, 1 is an infrared lens and 2 is a hard thin substrate. Guiding grooves 4 are prepared in the substrate 2 such that the lens 1 may be plugged into the guiding grooved 4 and is enveloped in the substrate 2.

The lens assembly so prepared provides desired optical features and hardness. When the infrared lens assembly is attached to an infrared sensing system, the thin substrate faces the external, whereby dusts will not at affixed to the grooves of the lens. When an infrared light passes through the thin substrate 2, it is refracted by the plastic lens and focused. In the inner surface of the thin substrate 2, a corresponding diffraction lens (not shown) may be prepared, such that the chromatic aberration in the optical system may be reduced.

EMBODIMENT

A Fresnel refraction lens is prepared. Specification of the lens: Focus 5 cm, wavelength 8–12 μm, f/# 1.0 (<1.0), thickness 500 μm. The cross sectional design of the lens may be represented by the following aspheric equation:

$$Z = C*Y^2/(1+(1-K+1)C^2Y^2)^{1/2}$$

Wherein C=0.3, K=0.001, $Y^2$=0:0.001:2.5

The lens is assembled with a Ge wafer with a diameter of 5 cm, adhered with a UV adhesive. Transmission rate of the lens assembly is measured and the results are shown in FIG. 4.

Figure 4:
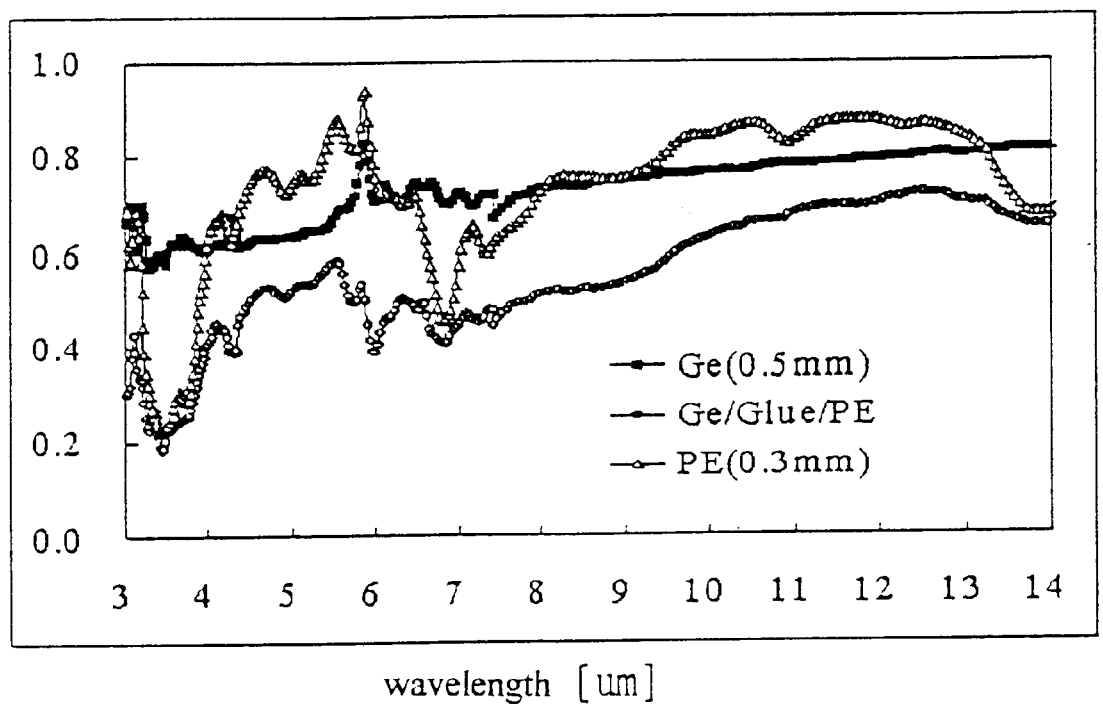
FIG. 4 illustrates the transmission rate of one embodiment of the thin infrared lens of this invention.

As shown in FIG. 4, although no reflection resistant film is applied to the Ge wafer, the transmission rate of the lens assembly at the wave length of 18–12 μm is still over 50%. The TV adhesive brings almost no influence to the average transmission rate of the lens assembly.

In another embodiment of this invention, a diffraction lens is prepared on the surface of the thin substrate 2. Such a design may reduce the chromatic aberration in the optical and improve the effects of the thin infrared lens of this invention.

EFFECTS OF THE INVENTION

The thin infrared lens of this invention may be used as the preposition optical system of an infrared sensing system. As the infrared lens is thin, material costs thereof may be greatly reduced. The infrared lens may be prepared in a quantity. The preparation of the thin substrate and the assembly of the infrared lens and the substrate are also simplified. Manufacture costs are thus reduced. The provision of the thin substrate makes it possible to use a soft plastic optical lens. It is then not necessary to add into the plastic material any harden additives to damage its transmission rate. The thin substrate of this invention provides freedom in selecting the material according to the need of the optical system. The reflection resistant film may be applied to the thin substrate, whereby the difficulty in applying a reflection resistant film to the plastic material can be solved.

As the present invention has been shown and described with reference to preferred embodiments thereof, those skilled in the art will recognize that the above and other changes may be made therein without departing form the spirit and scope of the invention.

What is claimed is:

1. An infrared lens assembly comprising a substrate, an infrared lens membrane and a diffraction lens attached to said substrate, wherein said substrate may be transmitted by an infrared light and said substrate is configured to maintain the shape of the lens membrane.

2. The infrared lens assembly according to claim 1 wherein said infrared lens is a Fresnel refraction lens.

3. The infrared lens assembly according to claim 1, further comprising a reflection resistant film applied to an edge of said substrate.

4. The infrared lens assembly according to claim 2, wherein said Fresnel refraction lens comprises a material that may be processed by casting or injection.

5. The infrared lens assembly according to any of claims 1, 2, 3 and 4, wherein said infrared lens is prepared by injecting or casting an infrared lens material to said substrate.

6. The infrared lens assembly according to any of claims 1, 2, 3 and 4, wherein said infrared lens is adhered to said substrate.

7. An infrared lens assembly comprising an infrared lens membrane enveloped by a substrate, wherein said substrate may be transmitted by an infrared light and said substrate is configured to maintain the shape of the lens membrane.

8. The infrared lens assembly according to claim 7 wherein said infrared lens is a Fresnel refraction lens.

9. The infrared lens assembly according to claim 7, further comprising a reflection resistant film applied to an edge of said substrate.

10. The infrared lens assembly according to claim 7, further comprising a diffraction lens attached to said substrate.

11. The infrared lens assembly according to claim 8, wherein said Fresnel refraction lens comprises a material that may be processed by casting or injection.

* * * * *